United States Patent [19]

Arnold

[11] Patent Number: 5,054,723
[45] Date of Patent: Oct. 8, 1991

[54] HINGED TUBE SUPPORT

[75] Inventor: Randall C. Arnold, Maplewood, Minn.

[73] Assignee: Augustine Medical, Inc., Eden Prairie, Minn.

[21] Appl. No.: 510,988

[22] Filed: Apr. 19, 1990

[51] Int. Cl.⁵ .............................................. F16L 3/08
[52] U.S. Cl. ............................ 248/65; 128/DIG. 26; 128/912; 604/174; 403/93; 16/319; 16/350; 16/360; 16/386; 16/387; 16/DIG. 29
[58] Field of Search ......................... 16/319, 343–345, 16/347, 348, 350, 351, 357, 360, 361, 363, 364, 365, 374, 376, 386, 387, DIG. 29, 251, 268; 128/DIG. 26, 912; 604/174; 248/65, 68.1, 75, 80, 81, 70, 82, 83, 528, 529; 43/21.2; 403/84, 93, 99; 220/335

[56] References Cited

U.S. PATENT DOCUMENTS

| | | | |
|---|---|---|---|
| 934,726 | 9/1909 | Henry | 16/363 |
| 960,085 | 5/1910 | Giles | 16/350 |
| 1,855,630 | 4/1932 | Hempel | 248/81 |
| 1,917,336 | 7/1933 | Spitz | 16/374 |
| 2,857,618 | 10/1958 | Jordan | 16/386 |
| 3,338,538 | 8/1967 | Roche | 128/DIG. 26 |
| 4,014,128 | 3/1977 | Hrdlicka | 43/21.2 |

FOREIGN PATENT DOCUMENTS 2516098  11/1975  Fed. Rep. of Germany ........ 16/353

Primary Examiner—Richard K. Seidel
Assistant Examiner—Edward A. Brown
Attorney, Agent, or Firm—Baker, Maxham, Jester & Meador

[57] ABSTRACT

A tube support for facilitating bedside attachment of a life support tube or duct includes a base member configured to rest on a surface, a tube support member having a tube support shoulder at one end thereof and a pivotal attachment extending between the base member and the tube support member for pivotally connecting the base and tube support members.

7 Claims, 2 Drawing Sheets

HINGED TUBE SUPPORT

BACKGROUND OF THE INVENTION

The field of the present invention is medical equipment, and more particularly, equipment for bedside patient care, and still more particularly, equipment for providing tubes, ducts, lines and the like to patients for transporting oxygen, medicament, or for other treatment.

In hospitals and particularly intensive care units, it is not uncommon for patients to require breathing assistance, a supply of pure oxygen, nutrients, medicament or other treatment requiring the use of tubes, ducts, lines and the like which are attached on or about the patient. Also, in the treatment of hypothermia by a convective apparatus, warmed air must be delivered to an inflatable thermal blanket through a large diameter, flexible duct.

In the case of tubes or ducts providing oxygen from breathing apparatus or warmed air from a blower, the tube or duct may simply be draped over the side of the bed, in which case it may tend to become detached from the patient or patient apparatus to which it is connected. To overcome this disadvantage, it has been proposed to use a generally L-shaped tube support apparatus having a lower portion adapted to fit under a mattress or between a mattress and a frame, and an upwardly extending portion having a notch at the top adapted to support and lock a tube or duct in a fixed position relative to the connection to which the tube or duct is attached, without imparting any axial strain or disconnecting force on the connection. Such apparatus, however, are bulky and inconveniently space-consuming when not in use, as for example during storage or transport.

SUMMARY OF THE INVENTION

The present invention is directed to a tube support having the advantage of enhanced space saving ability for storage and transport, whereby hospital operations can be improved. To that end, there is provided a base member configured to engage a surface, a tube support member comprising a tube support shoulder at one end thereof, and a pivotal attachment extending between the base member and the tube support member for pivotally connecting the base and tube support members.

It is, therefore, an object of the present invention to provide a tube support which is readily configurable from an operational to a storage or transport position, for enhanced space-saving ability and improved hospital operations.

BRIEF DESCRIPTION OF THE DRAWING

These and other objects, advantages and features of the invention will be more readily appreciated when read in conjunction with the accompanying drawing, in which.

DETAILED DESCRIPTION OF THE PREFERRED EMBODIMENTS

Figure 1:
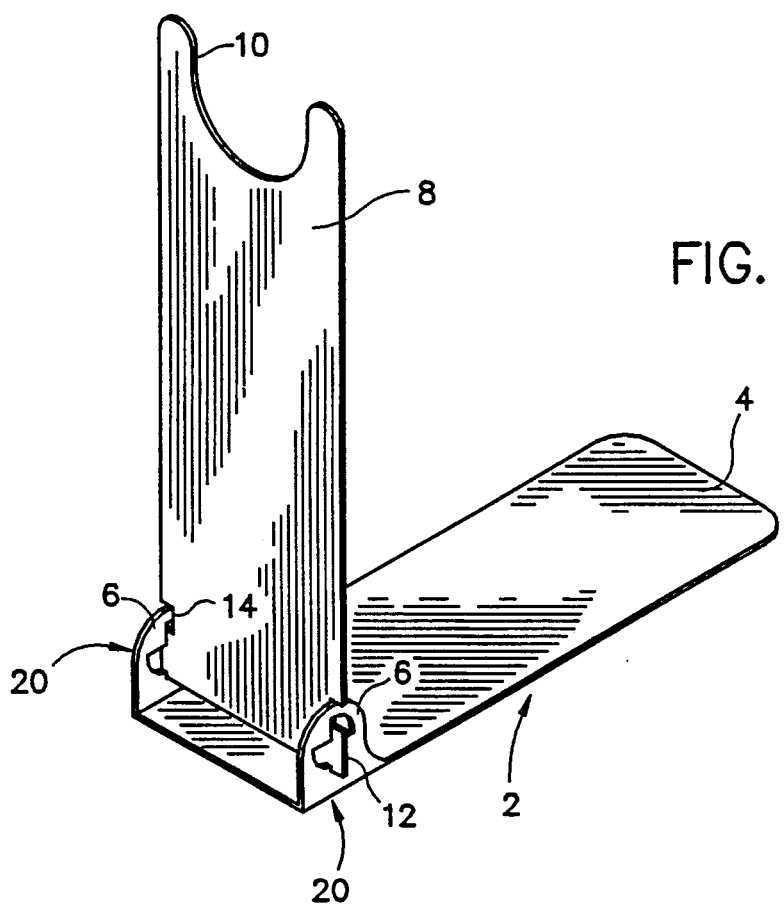
FIG. 1 is a perspective view of a hinged tube support constructed in accordance with the present invention showing the support member in an operational position.
Figure 2:
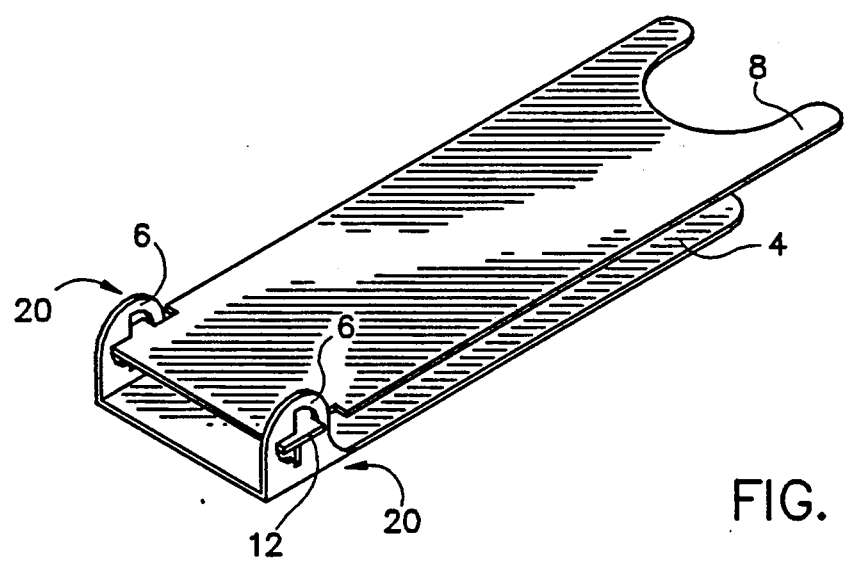
FIG. 2 is a perspective view of the hinged tube support apparatus shown in FIG. 1 showing the apparatus in a storage position.

Turning now to FIGS. 1 and 2, a medical apparatus comprising a hinged tube support 2 is shown. The hinged tube support includes a bed attachment or base member 4 having a pair of ears or trunnion plates 6 formed at one end thereof, a tube support member 8 with an arcuate or "U"-shaped tube support shoulder 10 at the upper end thereof configured to support and grip the sides of a tube or duct, and a pair of trunnions 12 at the lower end thereof formed by a pair of notches 14 disposed proximate to the lower end of the tube support member 8. The bed attachment 4 member, including the ears or trunnion plates 6, and the tube support member 8 are substantially planar and formed from an appropriate sheet material such as molded plastic, sheet metal or other suitable structurally rigid material, provided, however, that the material is sufficiently flexible to permit outward movement of the ears or trunnion plates 6 so as to enable detachment of the bed attachment and tube holding members from one another.

Figure 3:
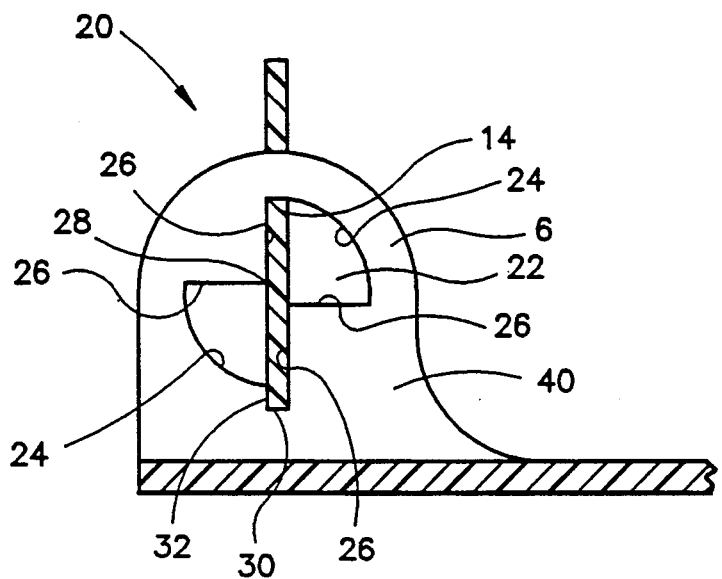
FIG. 3 is a truncated diagrammatic plan view of the pivotal attachment of the apparatus shown in FIGS. 1 and 2 showing the apparatus in an operational pivotally locked position.
Figure 4:
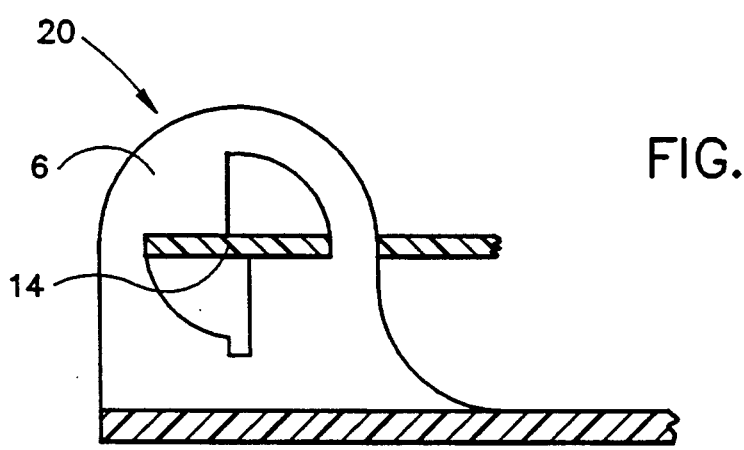
FIG. 4 is a truncated diagrammatic plan view of the apparatus shown in FIGS. 1 and 2 showing the apparatus in a storage position.
Figure 5:
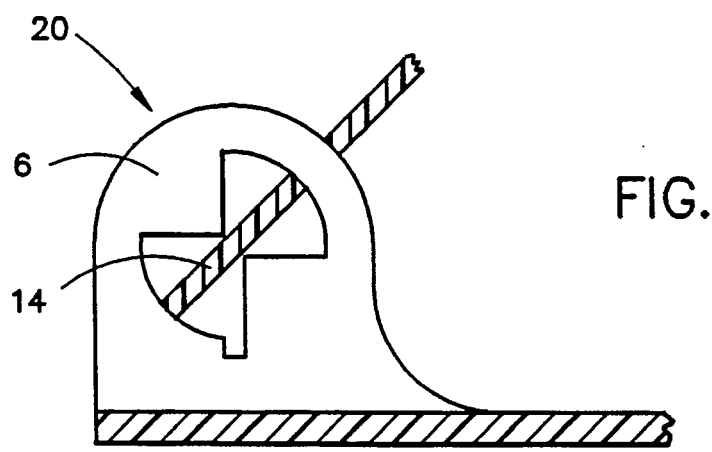
FIG. 5 is a truncated diagrammatic plan view of the apparatus shown in FIGS. 1 and 2 showing the apparatus in an intermediate pivotally unlocked position.

Referring now to FIGS. 3-5, the ears or trunnion plates 6 and trunnions 14 form, in combination, a pair of pivotal attachments or connections 20. The trunnion 14 thus defines a key member which is rotatably mounted in an arcuate keyway 22 formed in the trunnion plate 6. The arcuate keyway is defined by a pair of opposing arcuate guide surfaces 24 and respective pairs of stop surfaces 26 extending from the respective ends of the arcuate guide surfaces 24 to a central keyway area 28. As shown, the key member or trunnion 14 extends substantially between the arcuate guide surfaces 24 such that the surfaces 24 guide and direct the rotational motion of the key member or trunnion 14 within the keyway 22.

As shown in the figures, the trunnion or key member 14 is substantially rectangular, and opposing pairs of the stop surfaces 26 extending from the arcuate surfaces toward the central keyway area 28 are substantially coplanar and spaced from each other substantially the width of the key member or trunnion 14 so as to define a pair of key slots at the ends of the arcuate path defined by the arcuate guide surfaces 24. The key slots are positioned to provide a range of rotational angles between which the base and tube support members may be rotated. For example, the key slots may be positioned to prevent rotation of the base and tube support members beyond a storage position of about 0° relative angle and operational position of not less than about 90° relative angle.

Additionally, a lock slot 30 may be provided for locking the key member or trunnion 14 against rotation. The lock slot 30 is formed by extending the associated stop surface 26 radially beyond the arcuate surface 24 so as to define one side of the lock slot 30, and forming a parallel lock surface 32 spaced from the stop surface 26 a distance sufficient to accept the trunnion or key member 14 and extending radially beyond the associated arcuate guide surface 24. In this manner, the trunnion or key member 14 may be translationaly positioned in the lock slot 30 so as to prevent its further rotation.

The pivotal connection 20 may also be thought of as including a generally rectangular key member rotatably positioned in a divided cylindrical keyway defined by a generally cylindrical aperture truncated by a pair of opposing generally pie-shaped stop members 40. As shown in FIGS. 3-5, the apices of the opposing pie-shaped stop members 40 are spaced from each other a distance sufficient to permit the key member or trunnion 14 to align with opposing stop surfaces 26 of the opposing stop members 40 at the ends of the rotational path defined by the stop members 40 and the cylindrical keyway 22.

Thus, a novel medical apparatus comprising a hinged tube support having the advantages of collapsibility to facilitate storage and transport has been disclosed. While an application and embodiments of this invention have been shown and described, it should be apparent to those skilled in the art that many more modifications are possible without departing from the inventive concepts herein. The invention, therefore, is not to be restricted except in the spirit of the appended claims.

I claim:

1. A medical apparatus comprising a tube holding element pivotally connected to a bed engagement member, said tube holding element and bed engagement members being of substantially planar sheet material, said tube holding element comprising a generally U-shaped tube holding shoulder sized to engage and grip the sides of a tube, said tube holding element further comprising a pair of lower trunnions formed by a pair of notches disposed from the lower end of said tube holding element, said trunnions extending from the bottom of said notches to the lower end of said tube holding element, said bed engagement member having a first end configured to extend under a mattress and a second end having a pair of trunnion plates attached thereto, said trunnion plates supporting said tube holding element trunnions to provide a pivotal connection between said tube holding element and said bed attachment member, said trunnion plate also being formed from substantially planar sheet material and including a pair of opposing arcuate guide surfaces defining a pivoting path for said tube holding element, said trunnion plates further including a pair of stop surfaces defined at the respective ends of each of said opposing arcuate guide surfaces, said trunnions extending substantially between said arcuate guide surfaces and engaging said stop surfaces at the respective ends of the tube holding element rotational path, said trunnion plates further including at one end of one of said opposing arcuate guide surfaces a slot defined on one side by one of said stop surfaces and at the other side by an opposing surface extending radially beyond an associated one of said arcuate guide surfaces, said slot being sized to receive said trunnions when said tube holding element has rotated to a predetermined angle with respect to said bed attachment member, said trunnions being translationally positionable into said slot.

2. The medical apparatus of claim 1 wherein said trunnion plates are outwardly movable and wherein said trunnions are removably disposed in said trunnion plates, whereby said tube holding element and bed attachment members may be detached from one another.

3. In a tube support for facilitating bedside attachment of a tube or duct, the improvement in combination therewith comprising a base member configured to engage a surface, a tube support member including a tube support shoulder at one end thereof, and a pivotal attachment extending between said base member and said tube support member for pivotally connecting said base and tube support members, said tube support further including a first stop to prevent relative pivoting of said base and tube support members beyond a first predetermined angle, a second stop to prevent relative pivoting of said base and tube support members beyond a second predetermined angle and a lock for preventing relative pivoting of said base and tube support members beyond a predetermined range of angles defined in part by said second predetermined angle.

4. In a tube support for facilitating bedside attachment of a tube or duct, the improvement in combination therewith comprising a base member configured to engage a surface, a tube support member comprising a tube support shoulder at one end thereof, and a pivotal attachment extending between said base member and said tube support member for pivotally connecting said base and tube support members, said pivotal attachment being fixedly mounted to said base member and pivotally mounted to said tube support member, said pivotal attachment further including a first stop for preventing relative pivoting of said base and tube support members beyond a first predetermined angle and a second stop for preventing relative pivoting of said base and tube support members beyond a second predetermined angle, and a lock for preventing relative pivoting of said base and tube support members beyond a predetermined range of angles defined in part by said second predetermined angle.

5. In a tube support for facilitating bedside attachment of a tube or duct, the improvement in combination therewith comprising a base member configured to engage a surface, a tube support member, a tube support shoulder at one end of said tube support member, and a pivotal attachment extending between said base member and said tube support member for pivotally connecting said base and tube support members, said pivotal attachment including a pair of trunnion plates mounted to said base member and said tube support member including a pair of trunnions disposed in said trunnion plates.

6. In a tube support for facilitating bedside attachment of a tube or duct, the improvement in combination therewith comprising a base member configured to engage a surface, a tube support member with a tube support shoulder at one end thereof, and a pivotal attachment extending between said base member and said tube support member for pivotally connecting said base and tube support members, said pivotal attachment including a pair of trunnion plates integral with said base member having disposed therein a pair of opposing arcuate guide surfaces defining a pivoting path for said tube support member, and said tube support member including a pair of trunnions, said trunnions substantially extending between the opposing arcuate guide surfaces of said trunnion plates, said trunnion plates further including a pair of slots positioned to receive said trunnions when said base and support members have pivoted to a predetermined angle.

7. In a tube support for facilitating bedside attachment of a tube or duct, the improvement in combination therewith comprising a base member configured to engage a surface, a tube support member, a tube support shoulder at one end of said tube support member, and a pivotal attachment extending between said base member and said tube support member for pivotally connecting said base and tube support members, said base and tube support members being substantially planar and said pivotal attachment including a pair of opposing trunnion plates extending upwardly from one end of said base member, said trunnion plates having a pair of opposing arcuate guide surfaces and a pair of stop surfaces defined at the respective ends of each said opposing arcuate guide surfaces, said tube support member having defined at one end thereof a pair of trunnions mounted in said trunnion plates, extending substantially between said opposing arcuate guide surfaces, said trunnion plates further including at one end of one of said opposing arcuate guide surfaces, a slot defined on one side by one of said stop surfaces and at the other side by an opposing surface extending radially beyond said one of said opposing arcuate guide surfaces, said slot being sized to receive a tube support member trunnion when said tube support member has pivoted to a predetermined angle with respect to said base member, said trunnions being translationally positionable into said slot, whereby said tube support member may be locked into position.

* * * * *